US007482721B2

United States Patent
Kobayashi

(10) Patent No.: US 7,482,721 B2
(45) Date of Patent: Jan. 27, 2009

(54) POWER TRANSMISSION SYSTEM

(76) Inventor: Tsuguo Kobayashi, 24-8 Horifune 3 chome, Kita-ku, Tokyo (JP)

( * ) Notice: Subject to any disclaimer, the term of this patent is extended or adjusted under 35 U.S.C. 154(b) by 145 days.

(21) Appl. No.: 11/698,481

(22) Filed: Jan. 26, 2007

(65) Prior Publication Data
US 2007/0228855 A1 Oct. 4, 2007

(30) Foreign Application Priority Data
Mar. 28, 2006 (JP) ............................. 2006-088382

(51) Int. Cl.
*H02K 7/06* (2006.01)
(52) U.S. Cl. ..................... 310/80; 310/103; 335/306
(58) Field of Classification Search ............... 310/75 R, 310/80–84, 75 D, 90.5, 103; 335/228, 306
See application file for complete search history.

(56) References Cited

U.S. PATENT DOCUMENTS 2,790,095 A * 4/1957 Peek et al. .................. 310/103
2,943,216 A * 6/1960 Spodig ....................... 310/103
4,371,798 A * 2/1983 Kuroda ....................... 310/80
2007/0210659 A1* 9/2007 Long ........................... 310/80

FOREIGN PATENT DOCUMENTS

JP 2003-113923 4/2003

* cited by examiner

Primary Examiner—Ramon M Barrera
(74) Attorney, Agent, or Firm—Ladas & Parry LLP

(57) ABSTRACT

The present invention aims to alleviate a power loss possibly occurring when a power is transmitted from a driving side to a driven side using attraction/repulsion of magnets and to amplify (improve a joggle mechanism effect) an output.

A pair of inner magnets coupled to a driven side is located between a pair of outer magnets coupled to a driving side so as to face the pair of outer magnets 1 in non-contact relationship with the outer magnets 1. Rotation of the outer magnets 1 coupled to the driving side causes the inner magnet 2 coupled to the driven side to reciprocate. Each of the magnets 1 and 2 has a rod-like shape and the magnets 1 coupled to the driving side are respectively rotated around longitudinal centers of the respective rode shaped magnets 1.

5 Claims, 6 Drawing Sheets (A)

(B)

(C)

POWER TRANSMISSION SYSTEM

BACKGROUND OF THE INVENTION

The present invention relates to a power transmission system utilizing attraction/repulsion of a magnet to transmit a power from a driving side to a driven side.

Recently, a power transmission system utilizing attraction/repulsion of the magnet as transmission means replacing the conventional mechanic or hydraulic transmission means has been proposed with intent to alleviate a power loss during power transmission, to amplify an output (or achieve a joggle mechanism effect) and to achieve a reliability of transmission.

An example of such power transmission system utilizing attraction/repulsion of the magnet is disclosed in the document, Japanese Laid-Open Patent Application Gazette No. 2003-113923. This document discloses a power transmission system a magnet coupled to a driving side and a magnet coupled to a driven side are located to face each other in non-contacting relationship so that a rotary motion of the driving side may be converted to a sliding motion of the driven side under the effect of attraction/repulsion of the magnets.

The conventional power transmission system disclosed in the document comprises a plurality of disc-like shaped magnets arranged in a radial pattern so that the respective magnets on the driving side may synchronously rotate (rotate on axes thereof) and thereby switch-over of attraction/repulsion may be efficiently achieved.

However, the power transmission system of the prior art as disclosed in the document has disadvantageously accepted a considerable power loss due to the fact that it has been required for this system of the prior art to provide complicated transmission means such as gear means to rotate a plurality of magnets on the driving side and the precedent attraction/repulsion necessarily resists switch-over of attraction/repulsion due to the fact that the magnets face each other always along same surfaces of the magnets.

In view of the problem as has been described above, it is a principal object of the present invention to provide a power transmission system improved so that a power loss possibly occurring during switch-over of attraction/repulsion can be effectively alleviated and an output of the system can be amplified (or an efficient joggle mechanism effect can be obtained).

SUMMARY OF THE INVENTION

In this invention, a power transmission system comprising a pair of inner magnets coupled to a driven side so as to be located between a pair of outer magnets coupled to a driving side and facing said pair of outer magnets in non-contact relationship therewith so that rotation of said pair of outer magnets coupled to the driving side causes said pair of inner magnets coupled to the driven side to reciprocate, said power transmission system being characterized in that, each of these magnets is rod shaped and said pair of the outer magnets coupled to the driving side are rotated around an axis passing through longitudinal centers of the respective magnets.

Such measure advantageously eliminates demand for complicated transmission means such as gears to rotate a plurality of magnets on the driving side. Depending on relative angular positions of the inner/outer magnets as rotation of the outer-magnets, the magnets are partially free from face-to-face relationship so that resistance of attraction/repulsion to switch-over of attraction/repulsion is correspondingly alleviated. Specifically, about $\frac{1}{100}$ to $\frac{1}{120}$ of a force required to separate the magnets from each other as these magnets are stuck fast to each other without relative rotation is sufficient to separate these magnets from each other while these magnets relatively rotate.

A plurality of rod-shaped magnets are arranged in parallel one to another in each pair of the inner/outer magnets. With such measure, it is possible to adjust attraction/repulsion in said pair of magnets by increasing or decreasing the number of the magnets.

And three magnets are assembled in parallel one to another so that an intermediate magnet in each of magnet assemblies is staggered outward with respect to the remaining magnets. With such measure, attraction/repulsion of the intermediate magnet is relatively weakened.

Each of the magnets is magnetized in a direction orthogonal to the length of its rod shaped magnet so that the intermediate magnet in each of the magnet assemblies has a magnetic pole which is opposite to those of the magnets over-and underlying the intermediate magnet. Such measure facilitates the magnets to be assembled in parallel one to another without particular connecting means.

Thus, it is unnecessary for the power transmission system according to the present invention to employ complicated stages of power transmission and, depending on the relative angular positions of the rod-shaped magnets, the magnets have portions which are free from face-to-face relationship. Consequentially, resistance of precedent attraction/repulsion to a switch-over between attraction/repulsion of the magnets is alleviate so that the magnets can smoothly rotate, resulting in further alleviation of power loss.

Attraction/repulsion of the magnets can be adjusted by increasing or decreasing the number of the magnets forming each of the magnet assembly comprising the magnets arranged in parallel one to another, and thereby amplification of the power transmission system can be easily achieved.

The middle magnet in each of the magnet assemblies has its attraction/repulsion relatively weakened and consequentially a resistance of precedent attraction/repulsion to switch-over of attraction/repulsion can be correspondingly alleviated. Further, the magnets arranged in parallel one to another can be easily obtained and as a result, the system can be easily manufactured at a low cost.

DESCRIPTION OF PREFERRED EMBODIMENT

Details of the power transmission system according to the present invention will be more fully understood from the description given hereunder in reference with the accompanying drawings.

Figure 1:
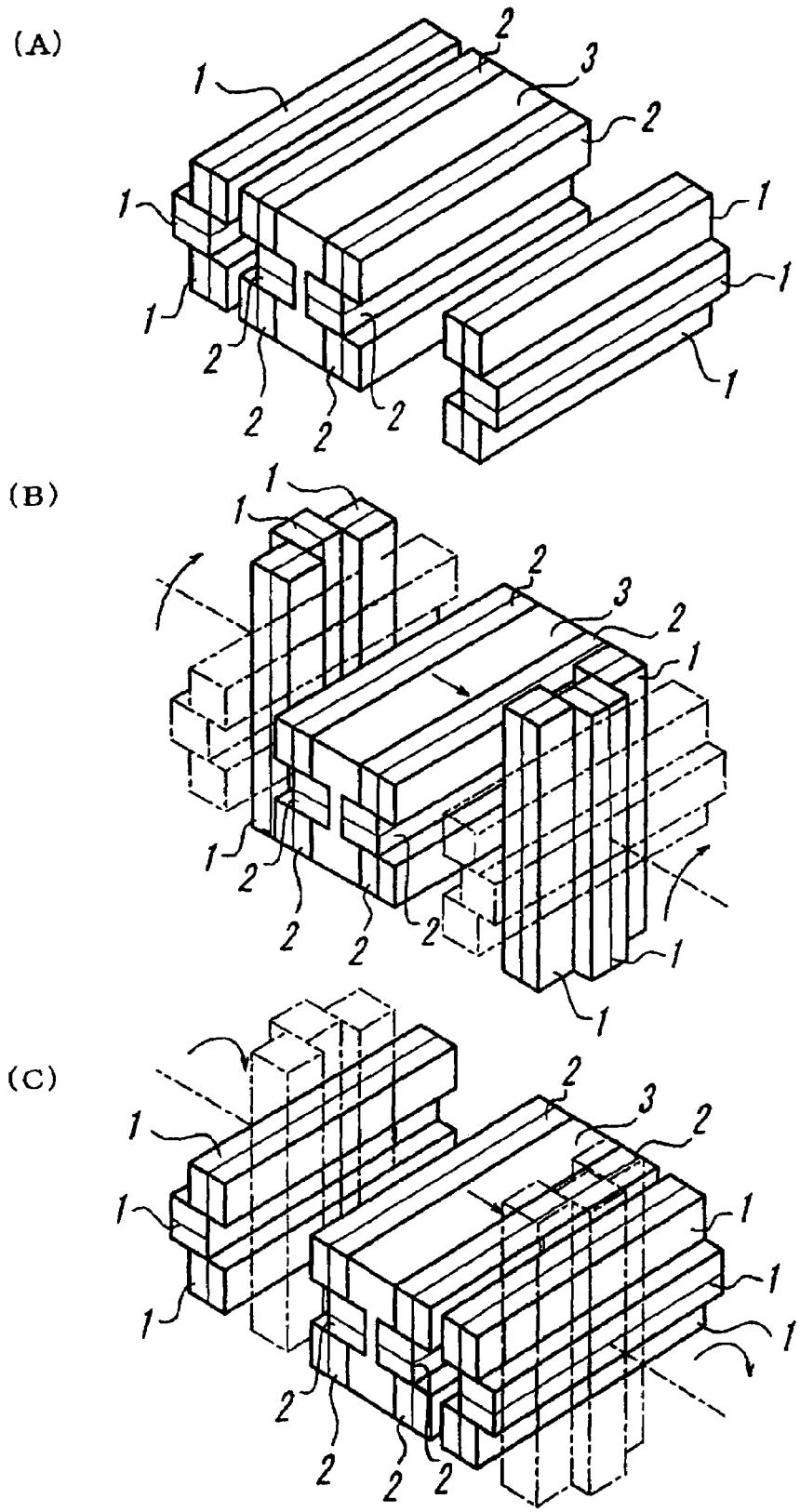
FIG. 1 is a perspective view showing a preferred embodiment of the power transmission system according to the present invention, of which (A) through (C) illustrate a sequence in which the system operates.
Figure 2:
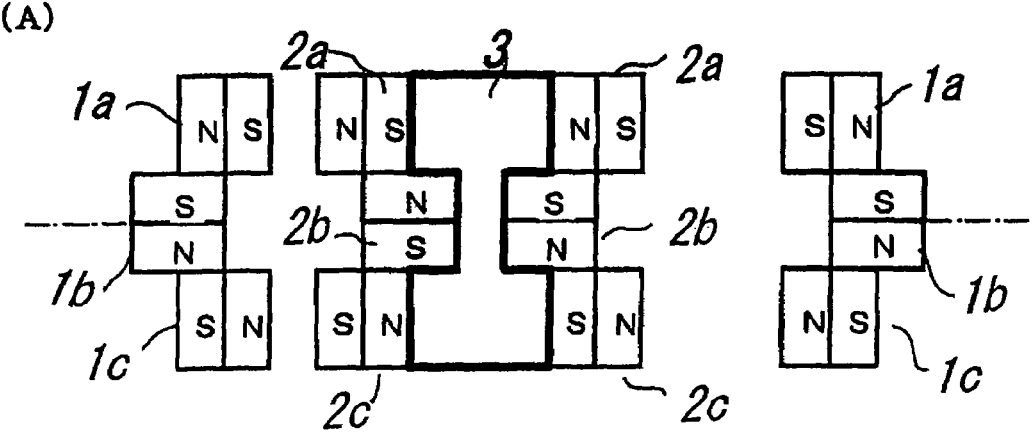
FIG. 2 is a front view corresponding to FIG. 1, of which (A) through (C) correspond to (A) through (C) of FIG. 1.
Figure 2:
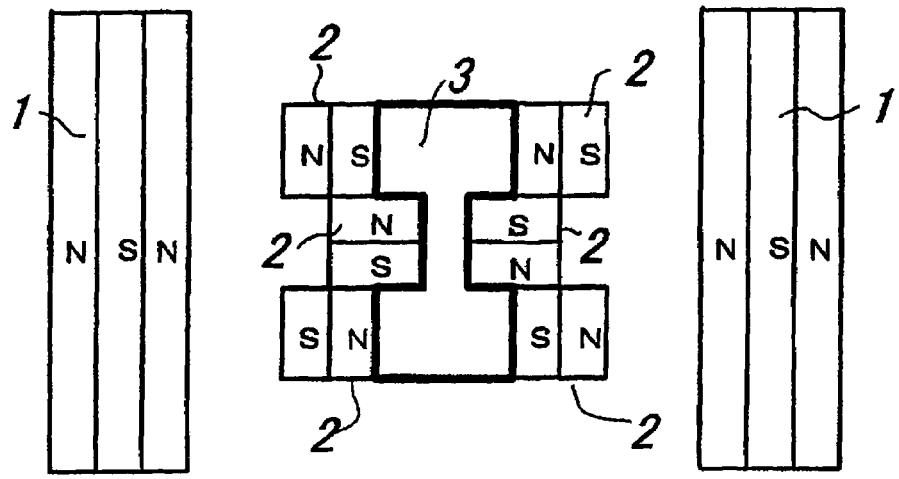
Figure 2:
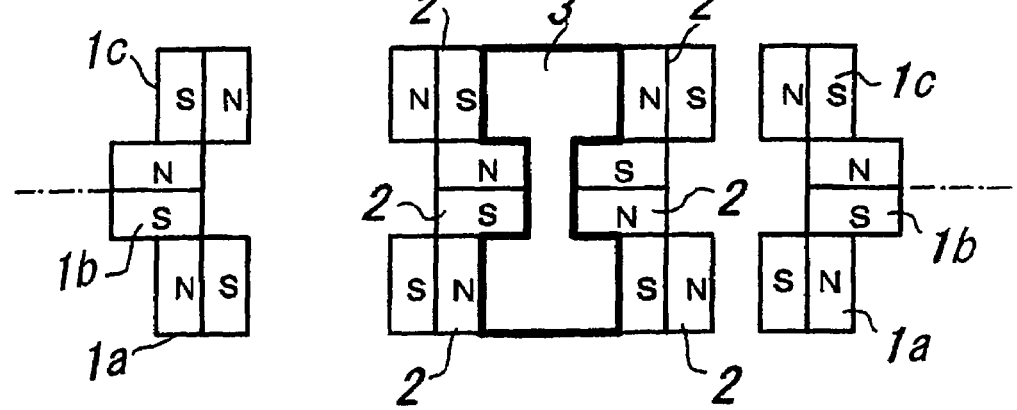

This power transmission system comprise a pair of outer magnet assemblies, each composed of three outer magnets 1 coupled to a driven side and a pair of inner magnet assemblies, each composed of three inner magnets 1 coupled to a driven side located between a pair of the outer magnet assemblies as shown in FIGS. 1 and 2. The inner magnets 2 are located on both sides of a core 3 respectively.

Each of these magnets 1, 2 is square rod-shaped and in each of the magnet assemblies, a plurality of magnets 1, 2 (three magnets 1a, 1b, 1c or 2a, 2b, 2c) are arranged in parallel one to another so as to be magnetized in alternative polarities in a direction orthogonal to the length of the respective rod-shape magnets 1, 2 (See FIG. 2). Especially, intermediate magnets 1b, 2b in each of the magnet assemblies is magnetized in the direction orthogonal to the length thereof so as to have a polarity opposite to that of the magnets 1a, 1c or 2a, 2c over- and underlying the intermediate magnet 1b or 2b respectively (see FIG. 2(A)).

The individual magnets 1 or 2 arranged in parallel one to another may be directly integrated without interposition of any connector means or the like to assure generation of magnetically high attraction/repulsion. In this way, a magnetic structure adapted to generate high attraction/repulsion can be easily obtained.

The outer magnets 1 in each of the outer magnet assemblies both coupled to the driving side are opposed to each other at a predetermined distance therebetween so as to have symmetric magnetic polarities (see FIG. 2(A)). The inner magnets 2 in each of the inner magnet assemblies both coupled to the driven side are located on both sides of a core 3 made of impermeable material as a block (see FIG. 2(A)). Between the pair of the outer magnets 1, the pair of the inner magnets 2 face the outer magnets 2 respectively in parallel but spaced therefrom.

The intermediate magnet 1b in each of the outer magnet assemblies is staggered outward with respect to the remaining magnets 1a, 1c over- and underlying the intermediate magnet 1b. Namely, the intermediate magnet 1b is staggered outward with respect to the plane in which the outer magnet assembly faces the inner magnet assembly and kept in contact with the adjacent magnet 1a, 1c over- and underlying the intermediate magnet 1b.

The intermediate magnet 2b in each of the inner magnet assemblies is staggered outward with respect to the remaining magnets 2a, 2c over- and underlying the intermediate magnet 2b. Namely, the intermediate magnet 2b is staggered outward with respect to the plane in which the inner magnet assembly faces the outer magnet assembly and kept in contact with the adjacent magnet 2a, 12 over- and underlying the intermediate magnet 2b.

Figure 3:
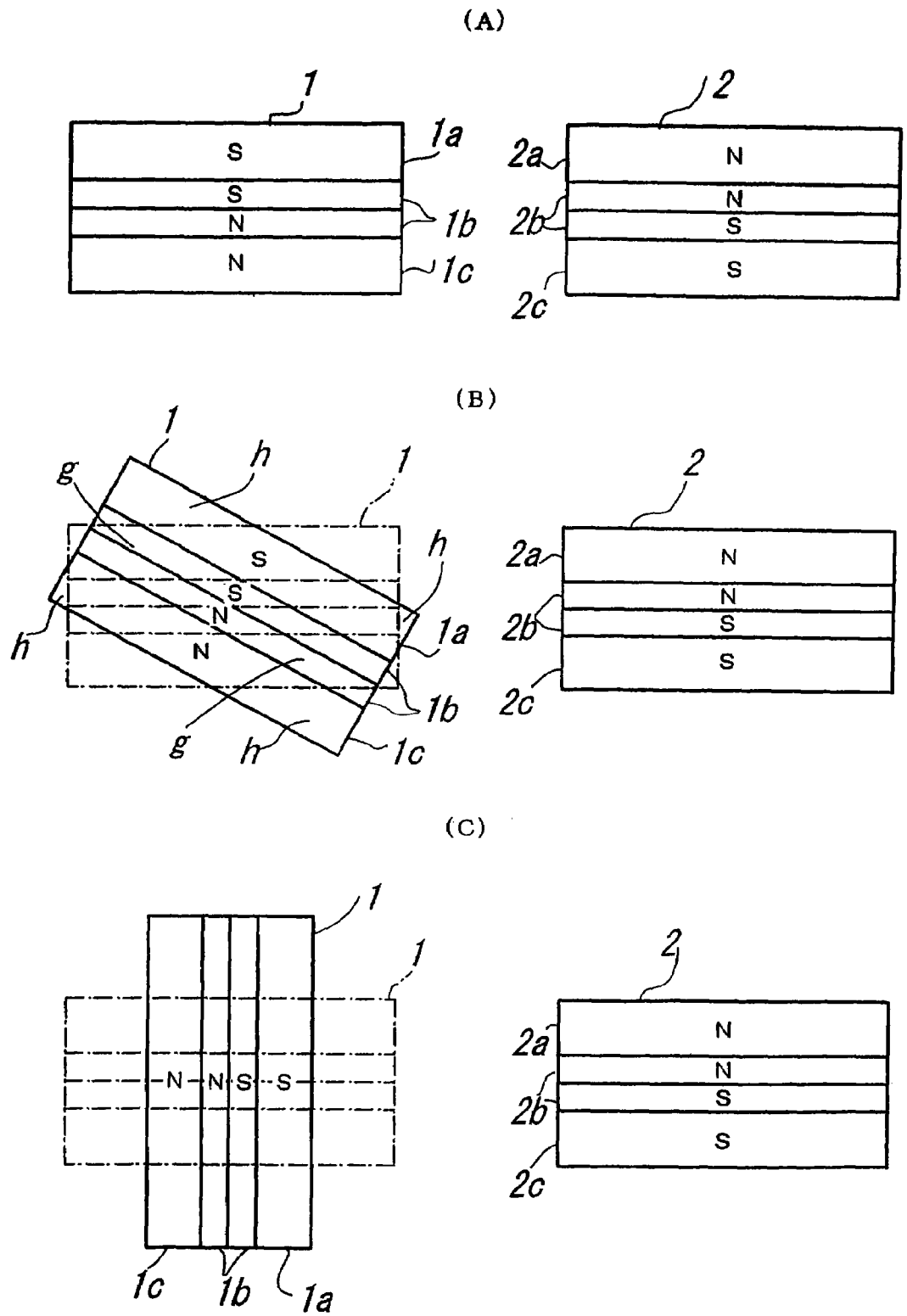
FIG. 3 is a side view illustrating a variation in a face-to-face relation of outer magnets facing inner magnets on one side, of which (A) illustrates the state corresponding to both FIG. 1(A) and FIG. 2(A); (B) illustrates the transitional state from FIG. 1(A) and FIG. 2(A) to FIG. 1(B) and FIG. 2(B); and (C) illustrates the state corresponding to both FIG. 1(B) and FIG. 2(B).

Thus, the outer magnets 1 always have poles facing the unlike poles of the inner magnets 2 on one side and have poles facing the same poles of the inner magnets 2 on the other side in the sate that the inner/outer magnet assemblies are arranged in parallel each other (see in FIG. 2(A) and FIG. 3(A)). Further, such magnetic attraction/repulsion generated along an interface defined between each pair of the adjacent magnets 1a, 1c or 2a, 2c is reduced toward the middle of the magnetic structure.

And the outer magnets 1 are adapted to be synchronized with each other to rotate around respective centers of the rod-shaped magnets.

Figure 4:
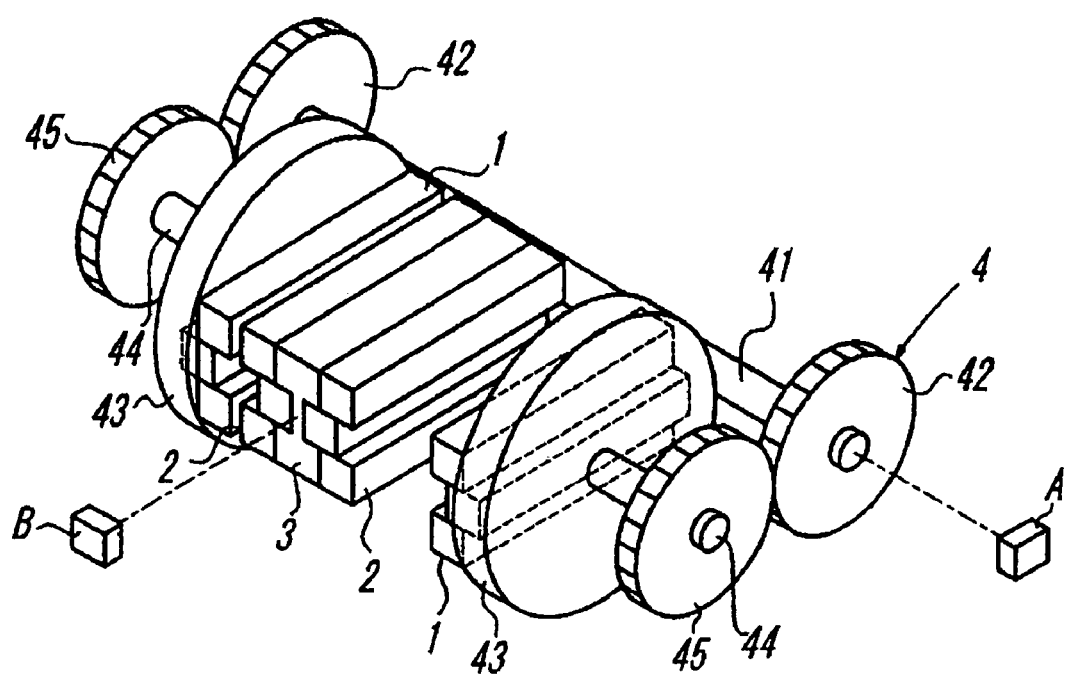
FIG. 4 is a perspective view showing a mechanical composition corresponding to FIGS. 1 and 2.

As shown in FIG. 4, rotating mechanism 4 for the outer magnets 1 coupled to the driving side may comprise, for example, a rotary shaft 41 coupled to a device A such as electric motor on the driving side, a pair of gears 42, 42 secured around said rotary shaft 41, a rotary shaft 44 for a pair of rotary discs 43, 43 and a pair of gears 45, 45 secured around said rotary shaft 44 so that the gears 42, 42 may be engaged with the gears 45, 45, respectively. The core 3 is coupled to a device B on the driven side.

And the pair of the inner magnets 2 as well as the core 3 coupled to the driven side are controlled so as to reciprocate between the pair of the outer magnets 1 coupled to the driving side.

Figure 5:
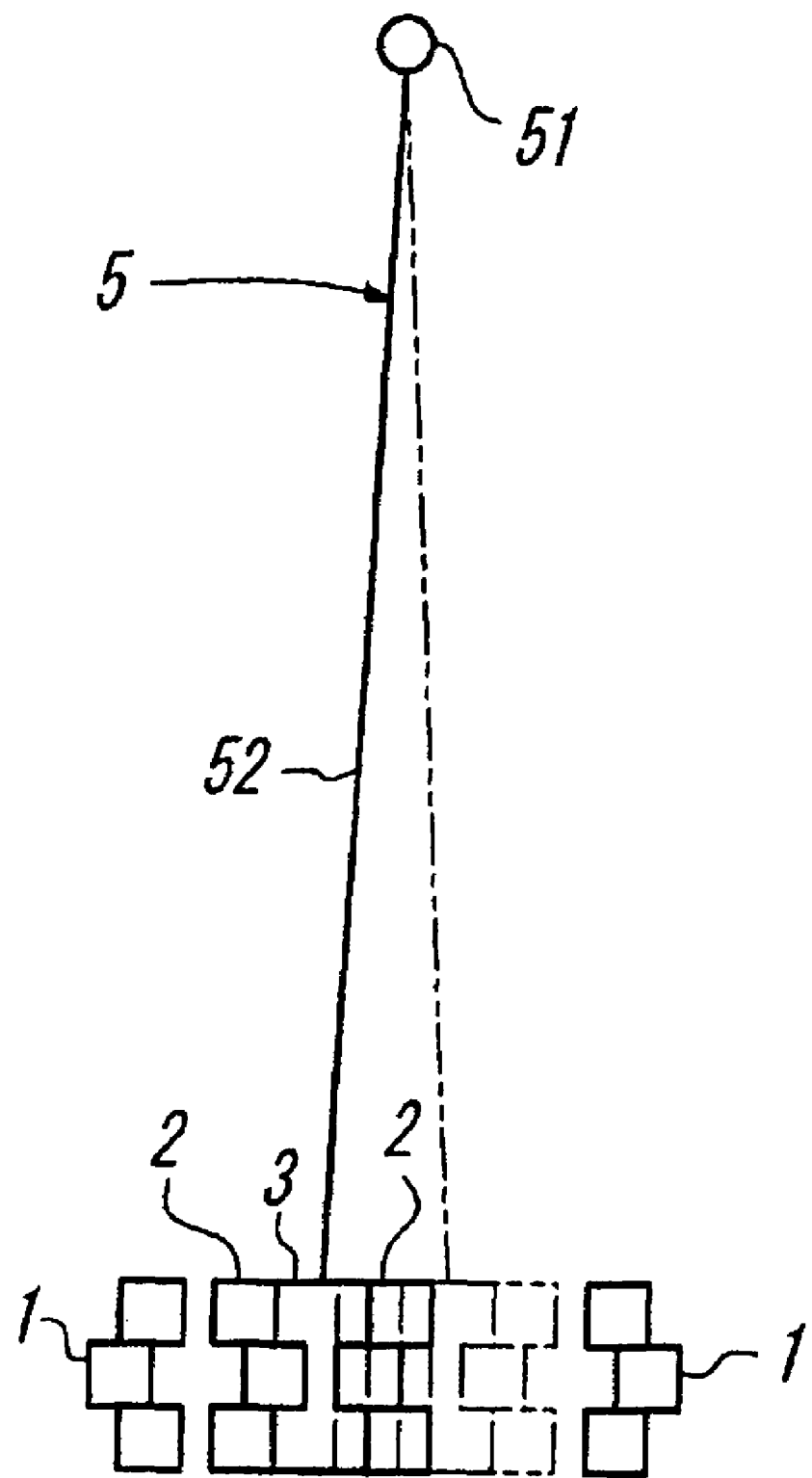
FIG. 5 is a schematic diagram illustrating a variant of the mechanical composition shown by FIGS. 1 and 2.
Figure 6:
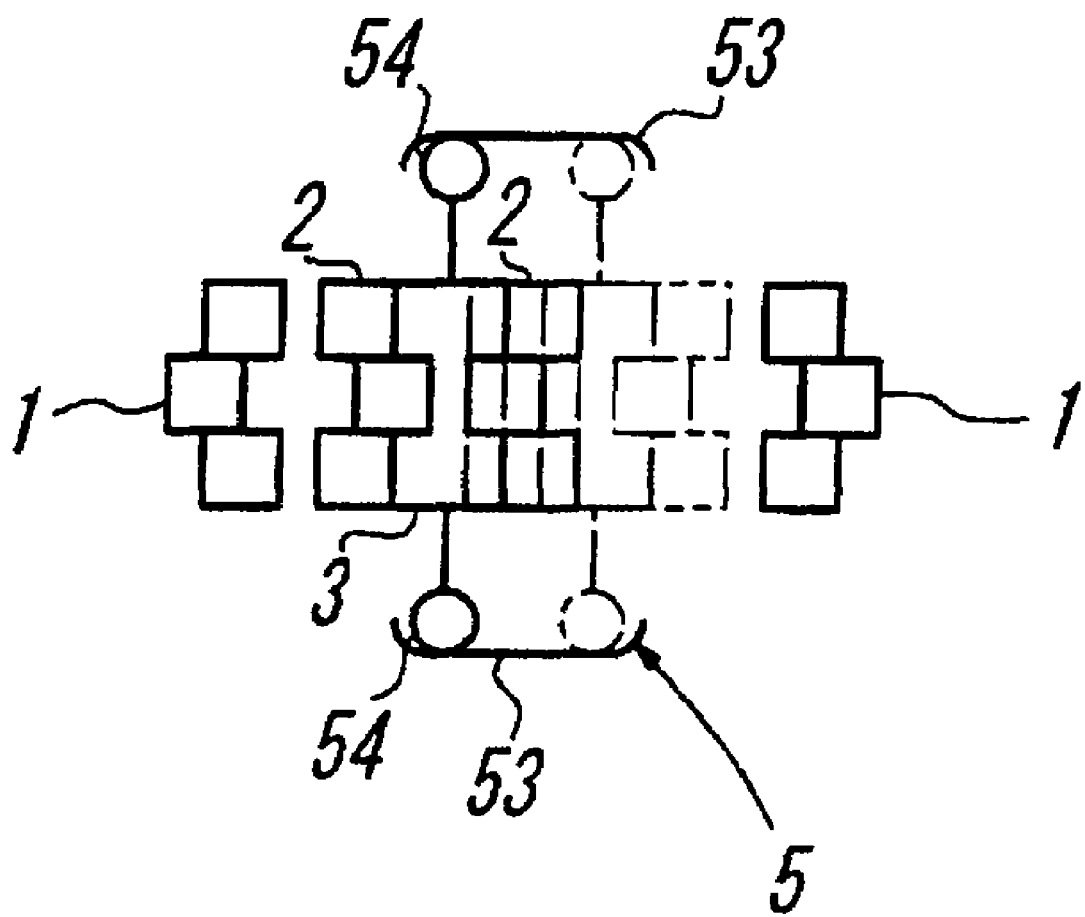
FIG. 6 is a schematic diagram illustrating a variant of the mechanical composition shown by FIG. 5.

As shown in FIG. 5, a control mechanism 5 for the magnets 2 coupled to the driven side may comprise, for example, a spindle 51 to which the core 3 is coupled by the intermediary of an arm 52 so that the inner magnets 2 and the core 3 may reciprocate like a pendulum. Alternatively, the control mechanism may comprise rail means 53 and the runner means 54 coupled to the core 3 movably engaged with said rail means 53, as schematically illustrated by FIG. 6.

In a sate that the pair of the outer magnets 1 face the pair of the inner magnets 2 in mutually parallel relationship respectively (in the course of the rotation of the outer magnets 1), the outer magnets 1 cause the inner magnets 2 (together with the core 3) to be attracted to the side in which the poles of the inner magnets 2 face the unlike poles of the outer magnets 1 and to be repulsed from the side in which the poles of the inner magnets 2 face the same poles of the outer magnets 1 (see FIG. 1(A), (C), FIG. 2(A), (C)) and FIG. 3(A))

In a state that the pair of the outer magnets 1 face the pair of the inner magnets 2 in mutually orthogonal relationship, the outer magnets 1 cause the inner magnets remain in equilibrium, and consequentially the inner magnets 2 are located midway between the pair of the outer magnets 1 (see FIGS. 1(B), 2(B) and 3(C)).

In this manner this process is alternately repeated (as illustrated by (A) through (C) of FIG. 1 and the process illustrated by (A) through (C) of FIG. 2), and thereby a rotary motion on the driving side is transmitted to the driven side in the form of conversion to a reciprocating motion. Power transmission in this fashion allows considerable amplification (like an effect of toggle mechanism) to be obtained because the magnets 1 and 2 provide effectively powerful magnetic attraction/repulsion.

In addition, such power transmission advantageously alleviates a power loss during the process of power transmission since it is unnecessary for the power transmission of this fashion to employ complicated stages of power transmission as have been required for the conventional power transmission system (as disclosed in the Patent document).

Furthermore, during transition from the state illustrated by (A) and (C) of FIG. 1 and correspondingly (A) and (C) of FIG. 2 to the state illustrated by (B) of FIG. 1 and correspondingly (B) of FIG. 2, the magnets 1 and 2 respectively have portions h which are free from face-to-face relationship due to the fact that the magnets 1 and 2 are square rod-shaped, and portions g which have relatively weak attraction/repulsion due to the fact that the intermediate magnets in the magnet assemblies are staggered outward with respect to the remaining magnets over- and underlying the intermediate magnets, respectively (see FIG. 3(B)). Consequentially, resistance of the attraction/repulsion to a switch-over between attraction/repulsion of the magnets 1 and 2 is alleviate so that the magnets 1 and 2 can smoothly rotate, resulting in further alleviation of power loss.

The present invention is not limited to the particular embodiments as have been described above in reference with the accompanying drawings. Specifically, the number of individual magnets 1, 2 forming each of the magnet assemblies may be selectively increased or decreased to adjust attraction/repulsion of the magnets 1, 2. Amplification of the power transmission also can be easily or effectively achieved. It is also possible without departing from the scope and the spirit of the invention to provide two sets of magnets 1, 2 in each of the magnet assemblies.

What is claimed is:

1. A power transmission system comprising a pair of inner magnets coupled to a driven side so as to be located between a pair of outer magnets coupled to a driving side and facing said pair of outer magnets in non-contact relationship therewith so that rotation of said pair of outer magnets coupled to the driving side causes said pair of inner magnets coupled to the driven side to reciprocate, said power transmission system being characterized in that, each of these magnets is rod shaped and said pair of the outer magnets coupled to the driving side are rotated around an axis passing through longitudinal centers of the respective magnets.

2. The power transmission system defined by claim 1, wherein a plurality of rod-shaped magnets are arranged in parallel one to another in each pair of the inner/outer magnets.

3. The power transmission system defined by claim 2, wherein three magnets are assembled in parallel one to another so that an intermediate magnet in each of magnet assemblies is staggered outward with respect to the remaining magnets.

4. The power transmission system defined by claim 3, wherein each of the magnets is magnetized in a direction orthogonal to the length of its rod shaped magnet so that the intermediate magnet in each of the magnet assemblies has a magnetic pole which is opposite to those of the magnets over- and underlying the intermediate magnet.

5. A power transmission system comprising a pair of inner magnet assemblies coupled to a driven side so as to be located between a pair of outer magnet assemblies coupled to a driving side and facing said pair of outer magnet assemblies in non-contact relationship therewith so that rotation of said pair of outer magnet assemblies coupled to the driving side causes said pair of inner magnet assemblies coupled to the driven side to reciprocate, said power transmission system being characterized in that each of these magnet assemblies comprises three rod shaped magnets arranged in parallel one to another, outer magnets in the outer magnet assembly on one side have poles facing the unlike poles of the corresponding inner magnets in the inner magnet assembly, outer magnets in the outer magnet assembly on the other side have poles facing the same poles of the corresponding inner magnets in the inner magnet assembly, an intermediate magnet in each of the magnet assemblies is staggered outward with respect of the remaining magnets so that the intermediate magnet has a magnetic pole which is opposite to those of the remaining magnets over- and underlying the intermediate magnet and is kept in contact therewith, the outer magnet assemblies coupled to the driving side are rotated around an axis passing through respective centers of length of the rod-shaped magnet assemblies.

* * * * *